BUTADIENE-ISOPRENE COPOLYMER RUBBER OF HIGH CIS CONTENT

Walter Nudenberg, West Caldwell, and Edward A. Delaney, Dover, N.J., assignors to Uniroyal, Inc., New York, N.Y.
No Drawing. Filed July 15, 1971, Ser. No. 163,062
Int. Cl. C08f 15/04; C08d 1/14, 3/04
U.S. Cl. 260—82.1     5 Claims

ABSTRACT OF THE DISCLOSURE

Butadiene-isoprene elastomeric copolymers in which 80–99 percent of the butadiene and 40–90 percent of the isoprene are in the cis configuration are made using ether-free "diphenyl magnesium"-titanium tetraiodide catalyst. The elastomers have good processing characteristics and yield vulcanizates having low hysteresis, and good cold properties and wear characteristics, making them useful for pneumatic tires.

---

This invention relates to an elastomeric copolymer of butadiene and isoprene, and a method of making same.

In known butadiene-isoprene copolymers the butadiene fragments tend toward trans 1,4-structure with increasing isoprene content ["Polymer Chemistry of Synthetic Elastomers" Part II by Kennedy, Joseph P., and Erik G. M. Tornqvist (High Polymers Vol. XXIII by Mark, H., ed., Interscience, 1969, 1044 p.) "Elastomers by Coordinated Anionic Mechanism" pp. 670–672]. Trans structures give stiff plastic-like compositions not having the elastomeric properties needed for pneumatic tires. Using the catalyst described in the prior art only about 70% of the butadiene units in the copolymer would be in the cis configuration. In contrast, the present invention provides butadiene-isoprene copolymers in which the butadiene microstructure is mainly cis-1,4 and the isoprene tends toward high cis. These are low hysteresis polymers which have good wear and processing characteristics and improved cold temperature properties, and can be used to build tires with an exceptionally good balance of properties.

The butadiene-isoprene copolymers of the invention possess better processing characteristics than normal cis-polybutadiene. For example, a cis-polybutadiene having a Mooney viscosity of 50 adds carbon black with difficulty whereas a butadiene-isoprene copolymer of the invention of the same Mooney readily adds carbon black and is simply processed.

Conventional high cis-polyisoprene homopolymer on the other hand has not made significant in-roads in tire use as a replacement for natural rubber, partly because it is not economical and partly because differences in molecular weight distribution, crystallinity and non-rubber content lead to differences in vulcanization time and properties of the vulcanizate.

U.S. Pat. 3,424,736, Walter Nudenberg et al., Jan. 28, 1969, discloses making cis-polybutadiene of controlled 1,4 structure, using various catalysts including diphenyl magnesium-titanium tetraiodide catalyst (Ex. 15). However, use of the catalyst to make butadiene-isoprene copolymer is not disclosed.

The new copolymer of the present invention may be described as an elastomeric copolymer of butadiene and isoprene wherein 80–99 mole percent, preferably 90–99 mole percent, of the butadiene and 40–90 mole percent of the isoprene are in the cis-1,4 configuration.

In accordance with the process of the invention, such a copolymer is made by solution copolymerization using an ether-free diphenyl magnesium-titanium tetraiodide catalyst. The catalyst can be prepared by mixing diphenyl magnesium and titanium tetraiodide in any desired order, in the presence or absence of one or both of the monomers. The mole ratio of diphenyl magnesium to titanium tetraiodide can fall between 1:5 and 5:1 and preferably between 1:1 and 2:1 in order to obtain a copolymer of high cis content. One possible order of addition of ingredients to the polymerization vessel is: (1) solvent; (2) butadiene; (3) isoprene; (4) diphenyl magnesium; and (5) titanium tetraiodide. This order is generally preferred because of increased yields and optimum stereoregularity.

The copolymerization is carried out in an inert solvent medium of the kind conventionally used for solution polymerization, including the hydrocarbon solvents, whether aromatic as in benezne, toluene, xylene, etc., cycloaliphatic as in cyclohexane, cyclooctane, etc., or aliphatic as in hexane, heptane, octane, etc. Mixtures of solvents may be used. The solvent medium may include a $C_3$–$C_6$ acyclic monoolefin, such as isobutylene, advantageously in conjunction with an aromatic hydrocarbon. Benzene or toluene are the solvents of choice.

The copolymerization is frequently effected at temperatures between about −10° C. and about 90° C. with temperatures between 0° and 75° C. ordinarily being preferred.

The copolymerization is not sensitive to pressure. Normal polymerization pressure ranges, sufficient to maintain liquid phase operation, are suitable (e.g., 30 to 150 p.s.i.g.).

The reaction vessel may be glass, carbon steel, stainless steel, or other non-reactive material. It should be dried and flushed with an inert gas prior to use.

The process may be carried out batchwise, or by batch-continuous methods, or entirely continuously. All of the monomers may be charged initially, or one or both monomers may be added continuously or incrementally at intervals. Premixed catalyst or catalyst ingredients may be added all at once at the start, or continuously or incrementally at spaced intervals as the copolymerization proceeds. The preferred method of active catalyst formation is to mix in the presence of monomer (particularly butadiene).

It is possible to control the molecular weight by regulating catalyst usage or incremental addition of the butadiene; delayed addition of a portion of the butadiene results in copolymer of higher Mooney viscosity.

For maximum isoprene incorporation into the isoprene-butadiene copolymer, it is desirable to delay the addition of isoprene until initiation of butadiene polymerization. At the instant of butadiene polymerization, small bubbles, called "micro bubbles," are formed due to changes in surface tension. If the isoprene is added at the point of formation of micro bubbles, maximum incorporation into the butadiene copolymer occurs.

The copolymerization may be terminated by adding a conventional short stop, such as an alcohol, secondary amine or rosin acid and antioxidant. The copolymer may be recovered by conventional methods, such as alcohol coagulation or steam floccing, to yield a rubber crumb which may be dried, for example in a vacuum or air oven.

Butadiene-isoprene copolymers of a variety of compositions may be made and depend only on the monomer ratio in the feed. As indicated previously, the butadiene microstructure is mainly cis-1,4. Isoprene is found to tend toward high cis. These are low hysteresis polymers which have good wear and processing characteristics.

These polymers have better cold properties than normal cis-polybutadiene rubbers, although their glass transition temperatures are approximately similar at 10 mole percent isoprene level. At higher isoprene levels (20%) an increase in glass transition temperature is noted (at 46% isoprene the glass transition temperature is —93° C.). In some cases isoprene levels of 90 or 95% may be desirable; for other purposes isoprene levels of 5 or 10% may be sufficient. The copolymers are characterized by having lower compounded Mooney viscosities than cis-1,4 polybutadiene compounds made with the same or lower Mooney viscosity. The lower compounded Mooney values indicate improved processability of these new copolymers.

This invention accordingly differs from the prior art in that the microstructure of the present copolymers is unique; the copolymers contain, as indicated, high cis butadiene units (80–99 percent) and therefore have good hysteresis properties, improved cold temperature properties and can be used to build tires with exceptionally good properties.

The high cis content butadiene-isoprene copolymer rubber of the invention may be compounded for vulcanization in the usual manner, using sulfer or other vulcanization agents, or sulfur donors, accelerators, activators, retarders, lubricants, processing aids, tackifiers, or any other suitable desired compounding ingredients. In making pneumatic tires the composition usually includes a filler, especially a reinforcing filler such as carbon black or silica. The copolymer may be oil-extended. It may be blended with other elastomers.

The microstructure of the copolymers of the invention may be established by conventional techniques, using infrared spectroscopy in conjunction with nuclear magnetic resonance, "NMR" [H. Y. Chen, Anal. Chem. 34, 1134 (1962), 34, 1793 (1962)].

The following examples will serve to illustrate the practice of the invention in more detail.

EXAMPLE I

In this example a series of copolymerization runs, at different butadiene:isoprene feed ratios, are carried out at a reaction temperature of 25° C. (Table 1), and again at 60° C. (Table 2); also a comparison is made between a run at 25° C., and a run at 50° C. (Table 3).

The solvent medium employed is toluene of high purity, free of sulfur compounds (Lewis bases) and moisture; it may first be dried by passage through a column of a drying agent, such as activated alumina, silica gel or molecular sieves, etc. Water may also be azeotroped off. The butadiene employed is freed from inhibitor by distillation and dried by passage through a bed of activated alumina balls. It is a commercial butadiene having the following typical specifications:

Butadiene, wt. percent _____min__ 99.0
Butenes, wt. percent _____max__ 1.0
Acetylenes, p.p.m. _____max__ 200
Allenes, p.p.m. _____max__ 50
Non-volatiles, wt. percent _____max__ 0.05
Carbonyls, p.p.m. _____max__ 50–100

The isoprene used is purified by distillation and/or passage through activated alumina. It is a commercial material having the following typical specifications:

Isoprene, wt. percent _____min__ 99
Butenes, wt. percent _____max__ 0.1
Pentene-2, wt. percent _____max__ 0.1

The diphenyl magnesium component of the catalyst is prepared according to U.S. Pat. 3,264,360, Walter Nudenberg et al., Aug. 2, 1966. It is ether-free and is used as a 0.1 molar solution in toluene. The titanium tetraiodide component of the catalyst is used as a toluene solution containing .02 mole/liter. The polymerization vessel is a one quart capped glass soda bottle, which is first flushed with inert gas (nitrogen, dried for example by passing in liquid phase through a column of activated alumina). By this procedure there is provided an oxygen-free system with a moisture content less than 25 p.p.m. The materials are charged to the bottle in the following order and quantities:

(1) toluene, 176 grams.
(2) butadiene, 24 grams.
(3) isoprene, variable 0 to 24 grams (see tables).
(4) diphenyl magnesium, 0.134 gram (0.75 milliequivalent).
(5) titanium tetraiodide, 0.139 gram (.25 millimole).

The catalyst is mixed in situ at the polymerization temperature (25° C. in Table 1, 6° C. in Table 2, 25° C. or 50° C. in Table 3). The polymerization is run for 3 hours at the indicated temperature. In each run the final polymer content is determined, the polymerization mix is shortstopped with 0.5 gram of methanol, 0.5 gram of diethyl amine, and 1% by weight of Ionol (2,6-di-tert.-butyl-4-methylphenol). The cement is coagulated by pouring into 3 liters of methanol and the polymer is dried in a vacuum oven. The polymer compositions and conversions for runs 1 to 5, in which the mole percent isoprene in the feed varies from 0 to 44%, are given in Table 1. In run 1, which is outside the invention and is included for purposes of comparison, no isoprene is charged and the microstructure of the resulting polybutadiene homopolymer is determined by infrared analysis. In runs 2 to 5, which represent the practice of the invention, the microstructures of the copolymers resulting when isoprene is included in the charge are determined by nuclear magnetic resonance ("NMR").

TABLE 1.—COPOLYMERIZATION OF BUTADIENE AND ISOPRENE AT 25° C.

|  | 1 | 2 | 3 | 4 | 5 |
|---|---|---|---|---|---|
| Run I: |  |  |  |  |  |
| Isoprene in feed, mole percent | 0 | 11 | 19 | 31 | 44 |
| Percent conversion | 97 | 96 | 87 | 81 | 70 |
| Polymer composition: |  |  |  |  |  |
| Butadiene, wt. percent (infrared) | 100 |  |  |  |  |
| Cis | 97 |  |  |  |  |
| Trans | 1 |  |  |  |  |
| Vinyl | 5 |  |  |  |  |
| Butadiene, mole percent (NMR) |  | 90 | 82 | 71 | 58 |
| Normalized microstructure: |  |  |  |  |  |
| 1,4 structure (cis and trans) |  | 92 | 95 | 96 | 95 |
| Vinyl |  | 8 | 5 | 4 | 5 |
| Isoprene, mole percent (NMR) |  | 10 | 18 | 29 | 42 |
| Normalized microstructure: |  |  |  |  |  |
| Cis |  | 43 | 48 | 61 | 67 |
| Trans |  | 57 | 52 | 32 | 26 |
| 3,4 |  |  |  | 7 | 7 |
| 1,2 |  |  |  |  |  |

It will be apparent from Table 1 that good yields of copolymer are formed at 25° C. Copolymer composition is essentially the same as the composition of the monomer feed. Both the monomers enter the copolymer largely in the cis 1,4 form.

In Table 2 the results of a similar series of runs carried out at a polymerization temperature of 6° C., are given. From Table 2, at the lower polymerization temperature the trans 1,4 content of the isoprene units appears to be lower than observed at higher temperature.

TABLE 2.—COPOLYMERIZATION OF BUTADIENE, AND ISOPRENE AT 6° C.

|  | 6 | 7 | 8 | 9 | 10 |
|---|---|---|---|---|---|
| Run I: |  |  |  |  |  |
| Isoprene in feed, mole percent | 0 | 11 | 19 | 31 | 44 |
| Polymer composition: |  |  |  |  |  |
| Butadiene, wt. percent (infrared): |  |  |  |  |  |
| Cis | 97.0 |  |  |  |  |
| Trans | 0.5 |  |  |  |  |
| Vinyl | 3.0 |  |  |  |  |
| Butadiene, mole percent (NMR) |  | 93 | 82 | 68 | 54 |
| Normalized microstructure: |  |  |  |  |  |
| 1,4 structure (cis and trans) |  | 96 | 94 | 91 | 91 |
| Vinyl |  | 4 | 6 | 9 | 9 |
| Isoprene, mole percent (NMR) |  | 11 | 18 | 32 | 46 |
| Normalized microstructure: |  |  |  |  |  |
| Cis |  | 64 | 72 | 81 | 78 |
| Trans |  | 36 | 17 | 6 | 13 |
| 3,4 |  |  | 11 | 13 | 9 |
| 1,2 |  |  |  |  |  |

Table 3 compares results at polymerization temperatures of 25 and 50° C.

TABLE 3.—EFFECT OF POLYMERIZATION TEMPERATURE

|  | 11 | 12 |
|---|---|---|
| Run I: |  |  |
| Reaction temperature, °C | 25 | 50 |
| Isoprene in feed, mole percent | 44 | 44 |
| Percent conversion | 80 | 62 |
| Polymer composition: |  |  |
| Butadiene, mole percent (NMR) | 60 | 56 |
| Normalized microstructure: |  |  |
| 1,4 structure (cis and trans) | 93 | 93 |
| Vinyl | 7 | 7 |
| Isoprene, mole percent (NMR) | 40 | 44 |
| Normalized microstructure: |  |  |
| Cis | 58 | 69 |
| Trans | 33 | 21 |
| 3,4 | 9 | 10 |
| 1,2 |  |  |

EXAMPLE II

This example demonstrates that the cis content of the butadiene remains high over a broad range of isoprene content in the copolymer.

Three bottle polymerizations, summarized in Table 4, are run according to the procedure described in Example I.

Table 4 gives results on polymerizations run at higher isoprene content. Butadiene microstructure is broken down by infrared analysis and shows that the butadiene fraction is indeed high cis even at higher isoprene levels.

TABLE 4.—EFFECT OF HIGHER ISOPRENE LEVELS

|  | 1 | 2 | 3 |
|---|---|---|---|
| Run II: |  |  |  |
| Reaction temperature, °C | 50 | 50 | 50 |
| Isoprene in feed, mole percent | 19 | 47 | 78 |
| Percent conversion | 78 | 65 | 43 |
| Polymer composition: |  |  |  |
| Butadiene, wt. percent (infrared): |  |  |  |
| Cis | 92 | 90 | 83 |
| Trans | 1 | 3 | 8 |
| Vinyl | 6 | 8 | 9 |
| Isoprene, mole percent (NMR) | 18 | 50 | 80 |
| Normalized microstructure: |  |  |  |
| Cis | 64 | 88 | 88 |
| Trans | 14 |  |  |
| 3,4 | 22 | 12 | 12 |
| 1,2 |  |  |  |

EXAMPLE III

This example demonstrates that copolymer composition is independent of catalyst concentrations. Intrinsic viscosity as one would expect is inversely proportional to catalyst concentration.

Four bottle polymerizations, summarized in Table 5, are run according to the procedure described in Example 1. The reactions are run for four hours at 10° C. The catalyst concentration is varied as indicated in Table 5, with the results shown. The intrinsic viscosity is measured in toluene at 30° C. in this and subsequent examples.

TABLE 5.—EFFECT OF CATALYST CONCENTRATION

|  | 1 | 2 | 3 | 4 |
|---|---|---|---|---|
| Run III: |  |  |  |  |
| Reaction temperature, °C | 10 | 10 | 10 | 10 |
| Mole percent isoprene in feed | 19 | 19 | 19 | 19 |
| Catalyst concentration: |  |  |  |  |
| $\phi_2$Mg (milliequivalents) | .675 | .6 | .525 | .45 |
| $TiI_4$ (millimoles) | .225 | .2 | .175 | .15 |
| Percent conversion | 91 | 91 | 85 | 68 |
| Intrinsic viscosity | 1.11 | 1.28 | 1.45 | 1.77 |
| Copolymer composition: |  |  |  |  |
| Butadiene, mole percent (NMR) | 86 | 87 | 87 | 86 |
| Normalized microstructure: |  |  |  |  |
| 1,4 structure (cis and trans) | 95 | 93 | 95 | 94 |
| Vinyl | 5 | 7 | 5 | 6 |
| Isoprene, mole percent (NMR) | 14 | 13 | 13 | 14 |
| Normalized microstructure: |  |  |  |  |
| Cis | 73 | 73 | 73 | 71 |
| Trans | 27 | 27 | 27 | 29 |
| 3,4 |  |  |  |  |
| 1,2 |  |  |  |  |

EXAMPLE IV

This example demonstrates control of molecular weight by incremental addition of butadiene. Three separate runs are made. In each run, 23.12 kg. of benzene, 1.56 kg. of butadiene and .447 kg. of isoprene are charged to a clean, dry, and inert gas flushed 10 gallon reactor. The charge is kept free of oxygen and the moisture content is below 25 p.p.m. 40.2 milliequivalents of diphenyl magnesium compound followed by 13.4 millimoles of titanium tetraiodide are charged to the reactor at 42° F. At 3% solids (38% conversion of initially charged monomers, elapsed time 2.5–3 hours) a second butadiene addition is made in each run as indicated in Table 6. The total reaction time is 10–15 hours. It will be seen from Table 6 that the Mooney viscosity of the copolymer increases with the amount of butadiene added in the second increment.

TABLE 6.—INCREMENTAL ADDITION OF BUTADIENE

|  | 1 | 2 | 3 |
|---|---|---|---|
| Run IV: |  |  |  |
| Butadiene increment (kg.) | .725 | 1.057 | 2.075 |
| Percent conversion | 93 | 86 | 97 |
| Calculated composition: |  |  |  |
| Isoprene, mole percent | 13.5 | 11.9 | 8.9 |
| Butadiene, mole percent (NMR) | 93 | 90 | 88 |
| Normalized microstructure: |  |  |  |
| 1,4 structure (cis and trans) | 96 | 96 | 95 |
| Vinyl | 4 | 4 | 5 |
| Isoprene, mole percent (NMR) | 11 | 10.3 | 11.4 |
| Normalized microstructure: |  |  |  |
| Cis | 82 | 76 | 75 |
| Trans | 18 | 15 | 17 |
| 3,4 |  | 9 | 8 |
| 1,2 |  |  |  |
| Mooney viscosity, ML-4 at 212°C | 33 | 44 | 78 |
| Intrinsic viscosity | 2.21 | 2.49 | 3.25 |
| Differential thermal analysis (DTA) $T_g$, )°C | −104 | −104 |  |

EXAMPLE V

This example illustrates practice of the invention on a larger scale.

111 kg. of benzene, 2.24 kg. isoprene and 7.80 kg. of butadiene are charged to a dry and oxygen free 50 gallon reactor. The reactor temperature is adjusted to 42° F. 201 milliequivalents of diphenyl magnesium followed by 67 millimoles of titanium tetraiodide are added. At 3.0% solids (38% conversion; elapsed time 2.5–3.0 hours) 5.4 kg. of butadiene is added. The reaction is allowed to proceed to completion (reaction temperature approximately 42° F. throughout). The viscosity of the final cement is 3200 cp. at 25° C. The reaction mixture is dumped into a nitrogen flushed vessel containing 10 gal. benzene, 2% Ional and 5% Resin 731D, disproportionated rosin (based on the rubber). The cement is steam flocced and dried in an air oven at 122° F. The reaction log is given in Table 7. The polymer is gel free, has a Mooney viscosity (ML-4 at 212° F.) of 41 and an average molecular weight, $M_n$, of 140,000.

TABLE 7.—COMPOSITION OF POLYMER WITH ELAPSED REACTION TIME AND CONVERSION

| Elapsed time, hrs | 0.5 | 1.75 | 4 | 8 | 17 |
|---|---|---|---|---|---|
| Calculated composition, mole percent isoprene | 18.5 | 18.5 | 11.9 | 11.9 | 11.9 |
| Conversion, percent | 11 | 21 | 37 | 56 | 77 |
| Butadiene, mole percent (NMR) | 87.5 | 86 | 87 | 88 | 89 |
| Normalized microstructure: |  |  |  |  |  |
| 1,4 structure | 95 | 97 | 94 | 95 | 94 |
| Vinyl | 5 | 3 | 6 | 5 | 6 |
| Isoprene, mole percent (NMR) | 12 | 14 | 13 | 12 | 10 |
| Normalized microstructure: |  |  |  |  |  |
| Cis | 74 | 73 | 74 | 76 | 68 |
| Trans | 9 | 16 | 19 | 15 | 17 |
| 3,4 | 17 | 11 | 7 | 9 | 15 |
| $T_g$, °C | −105 | −104 | −104 | −104 | −103 |
| I.V. (Intrinsic viscosity) | 1.48 | 1.32 | 1.59 | 2.20 | 2.53 |

EXAMPLE VI

This example demonstrates, through gel permeation chromatographic (GPC) technique, that the polymer of the invention is a true copolymer, rather than a mixture of homopolymers.

Following the procedure of Example V two runs are made using two different levels of catalyst to vary the molecular weight. One polymer, designated polymer A, is made with 48.3 milliequivalents of diphenyl magnesium and 16.1 millimoles of titanium tetraiodide; it has a Mooney viscosity (ML–4 at 212° F.) of 21 and contains 11% isoprene (calculated); the other, polymer B, is made with 40.2 milliequivalents of diphenyl magnesium and 13.4 millimoles of titanium tetraiodide; it has a Mooney viscosity of 33 and also contains 11% isoprene. The polymers are subjected to GPC examination and give plots with a single peak character, which is indicative of copolymerization rather than homopolymerization. Fractions obtained from the GPC procedure are analyzed with the results shown in Table B. (Polymer A). The uniformity of the analytical results in Table 8 is also indicative of copolymerization.

TABLE 8.—NMR ANALYSIS OF GPC FRACTIONS

| Fraction | Percent of total | Isoprene | | | Butadiene |
|---|---|---|---|---|---|
| | | Cis | Trans | Total | |
| 1 | 14.4 | | | | |
| 2 | 18.6 | 8.1 | 2.4 | 10.4 | 89.5 |
| 3 | 34.5 | 7.9 | 1.8 | 9.7 | 90 |
| 4 | 32.6 | 7.4 | 3.4 | 10.7 | 89 |

EXAMPLE VII

This example illustrates the excellent physical properties of a vulcanizate obtained from isoprene-butadiene copolymer of the invention prepared as in Example V. The copolymer used contains 15 mole percent isoprene and has a Mooney viscosity of 66 (ML–4 at 212° C.). It is compounded in a tire tread type recipe, given in Table 9A (Stock 9–1). For comparison a similar stock (Stock 9–2) is prepared using a commercial cis-polybutadiene rubber (Phillips cis-4 polybutadiene [ML–4-212° F.=45–50]). The process oil employed in the recipe, Sundex 790, is a petroleum hydrocarbon oil having a specific gravity of 0.9806, an SUS viscosity at 100° F. of 3,000; 37% aromatic, 28% naphthenic and 35% paraffinic. The processability characteristics of the copolymer of the invention are observed to be very similar to those for the cis-polybutadiene. The stocks are cured in a mold for 40 minutes at 292° F. Physical properties of the vulcanizates are determined with the results shown in Table 9B.

TABLE 9A
Tread Recipes—Isoprene/Butadiene Copolymer and cis-Polybutadiene

| Stock 9 | 1 | 2 |
|---|---|---|
| Ingredients, parts by weight: | | |
| 15 isoprene/85 butadiene (Ex. V) | 100 | |
| Cis-4 BR | | 100 |
| Antioxidant (N-isopropyl-N'-phenyl-p-phenylene diamine) | 1 | 1 |
| Carbon black (ISAF) | 55 | 55 |
| Processing oil (Sundex 790) | 5 | 5 |
| Disproportionated rosin (Resin 731D) | 5 | 5 |
| Zinc oxide | 3 | 3 |
| Stearic acid | 2 | 2 |
| CBS (N-cyclohexyl-2-benzothiazole sulfenamide) | 1 | 1 |
| DPG (diphenylguanidine) | 0.3 | 0.15 |
| Sulfur | 1.5 | 1.25 |

TABLE 9B
Properties of Vulcanizates From Isoprene/Butadiene Copolymer Compared to cis-Polybutadiene Rubber

| | Stock 9 | |
|---|---|---|
| | 1—I/B copolymer | 2—cis-BR |
| Hardness, Shore A | 64 | 62 |
| R. T. Scott tensile, p.s.i | 2,190 | 2,100 |
| Percent elong. at break | 480 | 470 |
| Auto. S–300, p.s.i | 1,100 | 985 |
| 212° F. Scott tensile, p.s.i | 1,160 | 1,050 |
| Percent elong. at break | 380 | 380 |
| Rebound, percent: | | |
| R.T. | 50 | 44 |
| 32° F. | 50 | 46 |
| 0° F. | 40 | 42 |
| 212° Goodrich flex., Δ° F., ASTM D623 (Method A) | 42 | 55 |
| 280° F. torsional hyst. | .160 | .127 |
| Gehman: | | |
| $T_2$, ° C. (ASTM D1053-65) | −59 | −33 |
| $T_5$, ° C. (ASTM D1053-65) | | −38 |
| $T_{10}$, ° C. (ASTM D1053-65) | | −43 |
| $T_{100}$, ° C. (ASTM D1053-65) | | |
| Retraction temp. (ASTM D1329-60): | | |
| TR–10, ° C | −70 | −57 |
| TR–70 | −49 | −27 |
| $T_g$, ° C | −109 | −109 |
| $T_m$, ° C | | −21 |

EXAMPLE VIII

This example illustrates the use of an isoprene-butadiene copolymer of the invention in an automotive tire. The isoprene-butadiene copolymer, prepared by the procedure described in Example V, has the following properties:

| | |
|---|---|
| Butadiene, mole percent (NMR) | 89 |
| Normalized microstructure: | |
| 1,4 structure (cis and trans) | 94.4 |
| Vinyl | 5.6 |
| Isoprene, mole percent (NMR) | 11 |
| Normalized microstructure: | |
| Cis | 66.6 |
| Trans | 33.4 |
| 3,4 | — |
| 1,2 | — |
| $M_n$ | 149,000 |
| Intrinsic viscosity | 3.51 |
| DTA $T_g$, (° C.) | −105 |
| Gel | 0 |
| Mooney viscosity (ML–4-212° F.) | 82 |

The polymer is made into a tire tread compound using the following recipe:

| Ingredients: | Parts by weight |
|---|---|
| Isoprene-butadiene copol. | 100 |
| Carbon black (ISAF) | 70 |
| Process oil (Sundex 790) | 38 |
| Stearic acid | 2.0 |
| Zinc oxide | 3.0 |
| Sulfur | 2.1 |
| CBS | 1.0 |
| DPG | 0.3 |
| N-isopropyl-N'-phenyl-p-phenylene diamine | 1.0 |
| Wax (Sunproof Improved) | 0.5 |

The compounded Mooney viscosity is 67 (ML–4-212° F.). Portions of the stock cured for 45' at 292° F. and 15' at 330° F. have the following physical properties:

| Cure | 45' | 15' |
|---|---|---|
| Autographic SS, R.T.: | | |
| S300, p.s.i | 1,230 | 990 |
| Tensile, p.s.i | 1,950 | 1,850 |
| Elong. at break, percent | 430 | 470 |
| Scott tensile R.T., p.s.i | 2,150 | 2,070 |
| Elong. at break, percent | 430 | 470 |
| Durometer | 59 | 56 |

The tread stock is used to build a number of pneumatic tires (tubeless 2-ply rayon tires, size 8.25 x 14, conventional carcass stock based on a blend of SBR, NR and cis-polybutadiene) according to conventional tire manufacturing procedures. The tires of course have the usual annular configuration, U-shaped in cross-section with the tread superimposed on the carcass and inextensible wire bead assemblies embedded in the terminal ends of the carcass where the tire is to be seated on a wheel rim. The tires are road tested on a proving group at Laredo, Texas with the results shown in Table 10, which also includes, for comparison, results on otherwise similar control tires made with conventional tread stocks. Tire group 10–1 in Table 10 has treads made of a 50/50 SBR/cis-BR blend; tire group 10–3 has treads made of SBR (Flexon 845). Group 10–2 tires are the tires of the invention, with treads based on the isoprene-butadiene copolymer. It will be seen from Table 10 that the tires made with isoprene-butadiene copolymer treads in accordance with the invention (Tire Group 10–2) show superior wear ratings in the 1296 mile test and improved wear over that of the SBR control in the 3424 mile highway test.

TABLE 10.—TIRE TESTS

|  | Tire group 10 | | |
| --- | --- | --- | --- |
|  | 1—Control, SBR/cis BR blend | 2—Invention IBR | 3—Control SBR |
| Compound Tg, °C | −89 | −93 | −68 |
| Rebound 32° F. (std. Bashore)[1] | 32 | 38 | 29 |
| Calcd. wet skid rating [2] | 98 | 91 | 100 |
| 1296 mile test: | | | |
| Avg. amb. temp. 56° F.; avg. road surface temp. 63° F.: | | | |
| Percent worn | 14.3 | 11.8 | 18.2 |
| Rating | 100 | 121 | 78.6 |
| Avg. amb. temp. 98° F.; avg. road surface temp. 121° F.: | | | |
| Percent worn | 20.0 | 17.5 | 28.0 |
| Rating | 100 | 114 | 71.5 |
| 3424 mile highway test: avg. amb. temp. 59° F.; avg. road surface temp. 64° F.: | | | |
| Percent worn | 8.3 | 8.4 | 9.6 |
| Rating | 100 | 98.8 | 86.5 |

[1] H. H. Bashore, Rubber Chem. & Technol. 10, 820 (1937).
[2] Wet skid rating=71.3-0. 40 R; 0.18 D—R=Bashore rebound at 0° C.; D=Durometer hardness at R.T. E.P. Percarpio and E.M. Bevilacqua, Rubber Chem. & Technol. 41, 870 (1968).

EXAMPLE IX

This example demonstrates that for maximum isoprene incorporation into an isoprene-butadiene copolymer, isoprene should be added to the polymerization at the point of formation of "micro bubbles." Micro bubbles are formed at the instant of initiation of butadiene polymerization due to changes in surface tension.

These experiments were run in clear, dry and inert gas flushed quart soda bottles. The solvents, monomers, and catalyst met all specifications mentioned earlier, i.e., moisture and $O_2$ free. The reaction was run at room temperature for 3.5 hours. The bottles were charged with 176 grams of benzene, 24 grams of butadiene, 0.675 milliequivalents $\phi_2Mg$, and .2250 millimoles of $TiI_4$. The bottles were hand shaken and the point of "micro bubble" formation noted (usually microbubbles were noted about one minute after catalyst addition).

6.9 grams of isoprene were added at various times after the initiation of butadiene polymerization. The data are given in the following table.

Maximum isoprene incorporation into the butadiene copolymer occurs when isoprene is added to the polymerization at the instant of butadiene polymerization initiation as indicated by the formation of "micro bubbles" (e.g., on a commercial scale by sensing device responsive to surface tension change).

EXAMPLE X

This example demonstrates the use of isobutylene as a cosolvent in the copolymerization of isoprene and butadiene. The use of isobutylene in the solvent system has several advantages.

(1) reduction in cement viscosity.
(2) improved heat transfer
(3) lower energy requirements in polymer floccing operation.

The following dry and $O_2$ free solvents and monomers purified by distillation and passage through silica gel and activated alumina were charged to a green glass quart soda bottle (dry and inert gas flushed).

| | | |
| --- | --- | --- |
| Benzene | grams | 105 |
| Isobutylene | do | 46.5 |
| Butadiene | do | 24 |
| Isoprene | do | 6.9 |
| $\phi_2Mg$ | milliequivalents | .75 |
| $TiI_4$ | millimoles | .25 |

These experiments were run for 18 hours at 2° C. and at R.T. The data is given in the following table.

TABLE 12

| Reaction temperature | 2° C. | R.T. |
| --- | --- | --- |
| Percent conversion | 60 | 80 |
| Butadiene, mole percent (NMR) | 87 | 84 |
| Normalized microstructure: | | |
| 1,4 structure (cis and trans) | 97 | 98 |
| vinyl | 3 | 2 |
| Isoprene, mole percent (NMR) | 13 | 16 |
| Normalized microstructure | | |
| Cis | 62 | 44 |
| Trans | 38 | 56 |
| 3,4 | | |
| 1,2 | | |
| Percent isobutylene | | |

Isobutylene can be used as cosolvent in isoprene-butadiene copolymerization without incorporation into polymer.

The use of $C_3$–$C_6$ monoolefins which have high heat capacity as cosolvents with aromatic hydrocarbon solvent has the advantage of reducing the solution viscosity with the result that it is possible to obtain better heat transfer during the polymerization and to continue the polymerization to a higher solution solids content.

Having thus described our invention, what we claim and desire to protect by Letters Patent is:

1. A method of making an elastomeric copolymer of butadiene and isoprene comprising contacting butadiene and isoprene, in an organic solvent medium, with ether-free diphenyl magnesium-titanium tetraiodide catalyst at a temperature of from −10° C. to 90° C., whereby there is formed an elastomeric copolymer wherein 80–99 mole

TABLE 11

|  | In total charge | Time isoprene addition after micro bubbles— | | | | |
| --- | --- | --- | --- | --- | --- | --- |
|  |  | 0 min. | 1 min. | 3 min. | 7 min. | 11 min. |
| Butadiene, mole percent (NMR) | 85 | 83 | 85 | 86 | 91 | 93 |
| Normalized microstructure: | | | | | | |
| 1,4 structure (cis and trans) | 96 | 96 | 94 | 93 | 98 | 99 |
| Vinyl | 4 | 4 | 6 | 7 | 2 | 1 |
| Isoprene, mole percent (NMR) | 15 | 17 | 16 | 14 | 9 | 7 |
| Normalized microstructure: | | | | | | |
| Cis | 74 | 82 | 82 | 86 | 78 | 79 |
| Trans | 13 |  | 6 |  | 22 | 21 |
| 3,4 | 13 | 18 | 12 | 14 |  |  |
| 1,2 | | | | | | |
| Calcd. comp., mole percent | 18.6 | 18.6 | 18.6 | 18.6 | 18.6 | 18.6 |
| Percent isoprene incorp | 81 | 92 | 86 | 75 | 48 | 38 | percent of the butadiene and 40–90 percent of the isoprene are in the cis-1,4 configuration, the isoprene content of the resulting elastomeric copolymer being from 5 to 95 mole-percent and the butadiene content of the said elastomeric copolymer being correspondingly from 95 to 5 mole-percent.

2. A method as in claim 1 in which the butadiene is added incrementally.

3. A method as in claim 1 in which the addition of the isoprene is delayed until initiation of the polymerization of the butadiene, as evidenced by the formation of micro bubbles.

4. A method as in claim 3 in which the solvent is in part a $C_3$–$C_6$ acyclic monoolefin.

5. A method as in claim 3 in which the solvent is a mixture of a $C_3$–$C_6$ acyclic monoolefin and an aromatic hydrocarbon.

References Cited

UNITED STATES PATENTS

| | | | |
|---|---|---|---|
| 2,977,349 | 3/1961 | Brockway et al. | 260—94.3 |
| 3,297,667 | 1/1967 | von Dohlen et al. | 260—82.1 |
| 3,424,736 | 1/1969 | Nudenberg et al. | 260—94.3 |

FOREIGN PATENTS

| | | | |
|---|---|---|---|
| 665,761 | 6/1963 | Canada | 260—82.1 |
| 709,899 | 5/1965 | Canada | 260—82.1 |
| 715,650 | 8/1965 | Canada. | |

JOSEPH L. SCHOFER, Primary Examiner

W. F. HAMROCK, Assistant Examiner

U.S. Cl. X.R.

152—357; 252—429; 260—94.3